United States Patent [19]
Sarkisian et al.

[11] Patent Number: 5,746,059
[45] Date of Patent: May 5, 1998

[54] TRIPLE EFFECT ABSORPTION APPARATUS AND METHOD

[75] Inventors: Paul Sarkisian; Uwe Rockenfeller, both of Boulder City, Nev.

[73] Assignee: Rocky Research, Boulder City, Nev.

[21] Appl. No.: 826,549

[22] Filed: Apr. 3, 1997

[51] Int. Cl.[6] ............................................. F25B 15/00
[52] U.S. Cl. ....................................... 62/101; 62/476
[58] Field of Search ..................... 62/101, 103, 476, 62/494

[56] References Cited

U.S. PATENT DOCUMENTS

| | | |
|---|---|---|
| 4,520,634 | 6/1985 | Oouchi et al. ......................... 62/476 |
| 5,205,136 | 4/1993 | DeVault et al. . |
| 5,335,515 | 8/1994 | Rockenfeller et al. . |
| 5,390,509 | 2/1995 | Rockenfeller et al. . |
| 5,584,193 | 12/1996 | Biermann ............................... 62/476 |

*Primary Examiner*—William Doerrler
*Attorney, Agent, or Firm*—Jerry R. Seiler, Esq.

[57] ABSTRACT

The third stage generator of a triple effect absorption apparatus may be operated at vapor pressures below 25 psig and more preferably below 15 psig by using a metal salt concentration in the absorption fluid in the third stage generator of at least 66.5%, by weight.

39 Claims, 1 Drawing Sheet

TRIPLE EFFECT ABSORPTION APPARATUS AND METHOD

BACKGROUND OF THE INVENTION

In U.S. Pat. Nos. 5,335,515 and 5,390,509 there are disclosed triple effect absorption cycle apparatus and systems incorporating one or more absorbers for directing an aqueous absorption fluid to first, second and third generators operating at successively higher temperatures. These triple effect apparatus include three condensers operating at successively higher temperatures and communicating with the generators. The three condensers are also interconnected whereby condensed refrigerant flows successively from the third condenser to the second condenser, then to the first condenser, and thereafter to one or more evaporators. The heat generated in the condensers is used to drive the lower generators. The use of such apparatus in which a single refrigerant such as water is used throughout the system achieves substantial improvement over prior art systems which rely on heat transfer coupling of heat exchangers with no common mass flows.

As advantageous as the aforesaid triple effect apparatus are, vapor pressures of the absorption solution in the high temperature, third generator are usually above 25 psig, and are normally operated at between about 40 and about 80 psig, typically at about 60 psig. In many areas, present boiler codes require that absorption cycle apparatus boilers or generators operating above 15 psig must be monitored by an operator at all times during operation. Such requirement obviously is economically disadvantageous, and where costs and expenses of operation are of great importance, the use of apparatus having high generator pressure requirements is handicapped. It is to the elimination of such a disadvantage of the aforesaid triple effect apparatus and systems that the present invention is directed.

SUMMARY OF THE INVENTION

The present invention is directed to methods of operating the triple effect absorption cycle apparatus using a high temperature third generator operating at reduced pressures, preferably less than 15 psig. The triple effect apparatus used in the invention is disclosed in U.S. Pat. No. 5,335,515, 5,390,509 as well as 5,205,136, all of which disclosures are incorporated herein by reference. The low pressure operation of the high temperature third stage generator is achieved, according to invention, by using relatively high metal salt concentrations in the absorption fluid in the third stage generator. The high concentration for strong solution in the third stage generator is achieved by using relatively low sorption fluid flow into the highest temperature generator and desorbing water vapor and allowing the salt concentration to substantially increase in the generator as compared to concentrations used in prior art systems.

DETAILED DESCRIPTION OF THE PREFERRED EMBODIMENTS

Figure 1:
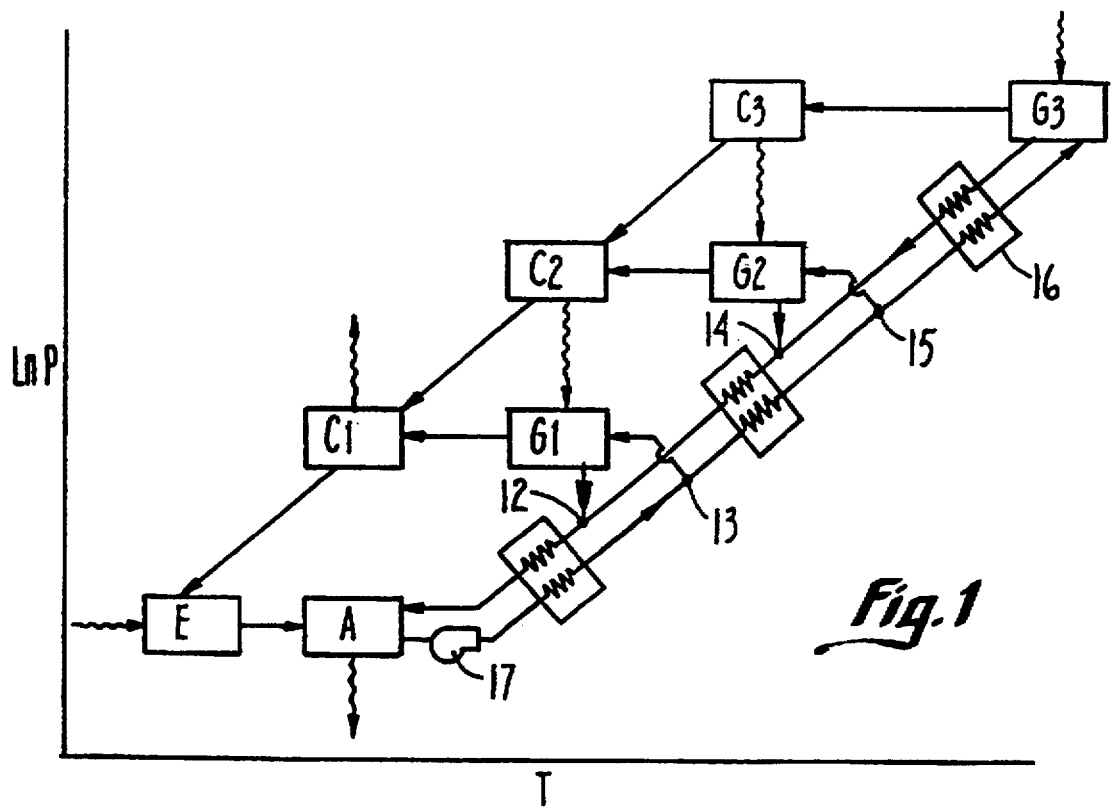
FIGS. 1 and 2 are schematic illustrations of triple effect absorption cycle apparatus which may be used and operated according to the invention.
Figure 2:
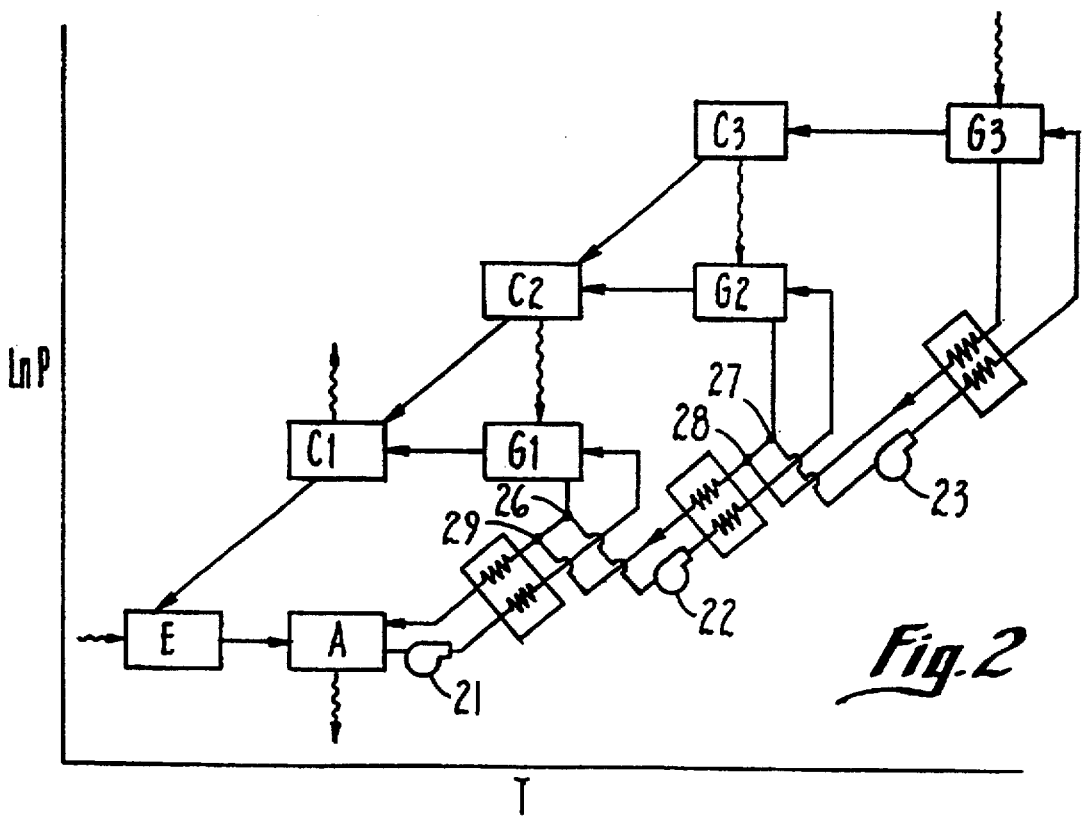

In FIGS. 1 and 2 there are schematically illustrated tripled effect cycle apparatus, which illustrations are substantially identical to corresponding FIGS. 1 and 2 in U.S. Pat. No. 5,390,509. In each of the illustrated triple effect systems, a single absorber and evaporator are used. However, the invention is not limited to single absorber apparatus and two or three absorbers and two or three evaporators may be used. Thus, all of the apparatus shown and disclosed in the aforesaid U.S. Pat. Nos. 5,335,515 and 5,390,509 may be used in the present invention. Multiple absorber and evaporator units are advantageous if fluid crystallization limits endanger safe operation of the cycle in the liquid solution field. However, the single evaporator absorber systems are shown for relative simplicity for describing the present invention.

The essential feature of the present invention is in operating the high stage generator, $G_3$ at an internal absorption fluid vapor pressure below the pressure which requires operator observation by code. For example, where the local code requires the presence of an operator where generator pressures are 15 psig, according to the invention, the high stage generator $G_3$ is operated below 15 psig. Of course, the lower stage generators $G_2$ and $G_1$ will also be operated at pressures below the code operator requirements. The low pressure operation is achieved by substantially increasing the salt concentration in the absorption fluid of the third stage generator. Typically, in using prior art systems as described in the aforesaid patents, the salt concentration in the absorption fluid in the high stage generator $G_3$ is increased via desorption of water by between about 4% and about 6% of the relatively weak concentration supplied to the generator. Thus, in such typical prior art systems, the salt concentration in the absorption fluid leaving the high stage generator $G_3$ is about 4% and about 6% higher than the salt concentration in the absorption fluid fed to the generator from an absorber, or from a lower stage generator. In the present invention, the salt concentration for the strong solution in the third generator is substantially increased to be capable of and sufficient to provide generator operating pressures below 25 psig. Specific salt concentration increases are between about 10% and about 25%, and preferably between about 12 and about 20%, by weight, from the concentration of salt in the weaker solution introduced into the generator. Such salt concentration increases are achieved by utilizing relatively low flows of the absorption fluid into the generator.

The temperatures within the generators, and particularly high stage generator $G_3$ will be substantially the same as described in the aforesaid patents. Typical third stage generator operating temperatures are between about 380° F. and about 500° F., with optimum operating temperatures between about 400° F. and about 450° F. Third stage generator $G_3$ is preferably direct fired for economical reasons, using a burner and combustion air pre-heating capabilities and components, well known to those skilled in the art. However, where appropriate, indirect heating of the high temperature generator $G_3$ may be used with phase change or pumped fluid loop equipment. Any remaining energy or sensible heat below that required to heat the high temperature generator may be directed to one or both of the lower stage generators. Thus, where the third stage generator is direct fired, available hot gases of combustion may be directed to heat one or more of the lower stage generators.

As shown in FIGS. 1 and 2, as well as described in substantial detail in the aforesaid U.S. Pat. Nos. 5,335,515 and 5,309,509, the disclosures of which are incorporated herein by reference, the fluid circuit for directing the aqueous absorption fluid between one or more absorbers and the three generators may be in series, parallel and reverse fluid flow, as well as combinations of two or more of these different flows. As such, any one or more of the absorbers may feed more than one generator with the same fluid, and the flow sized or metered for proper heat balance. Thus, usually the mass or volume flows from different absorbers to different generators are not the same or even, and when using junctions for combining fluids, the specific flows to a specific generator can be selected and regulated as desired. Particularly, according to the invention, it is important to regulate, control or meter the flow to the third stage generator $G_3$, in order to achieve low flow rates and allow the concentration of the salt within the absorption fluid to substantially increase. Thus, observing FIG. 1, flow splitting junctions 13 and 15, which preferably include appropriate pipe size restrictions or metering valves for selecting the mass or volume of fluid flows to the lower stage generators $G_2$ and $G_1$ as well as to high temperature generator $G_3$. Similarly, in FIG. 2, junctions 27 and 28, as well as 26 and 29 may be provided with pipes of suitable size, restrictions or metering valves for ultimately selecting the appropriate flow of absorption fluid to generator $G_3$ in order to carry out the present invention.

A preferred triple effect system according to the invention utilizes a parallel flow cycle arrangement, such as illustrated in FIG. 1, although again, the number of absorbers and/or evaporators are not limited to the single absorber systems shown. Such parallel flow systems may also be combined with series and/or reverse flow directing fluid loops, such as further described in the aforesaid and incorporated patents. Preferably, the flow to the third stage generator $G_3$ is below about 20% (mass or volume) of the total system weak solution flow, i.e., the portion of the fluid from the absorber in a single absorber system to $G_3$, or the weak solution absorber, designated $A_3$ in a three absorber system or $A_2$ or the portion from $A_2$ to $G_3$ in a two absorber system. More preferably, the weak solution flow to the third stage generator is less than about 15% of the total weak solution flow in the system.

The solutions making up the absorption fluids in a system according the present invention are aqueous solutions of a metal salt which may be an alkali, alkaline or transition metal halide, or an alkali metal hydroxide. The halide is preferably bromide or chloride, and the preferred metal is lithium. Thus, the preferred salts are lithium bromide or lithium chloride, or mixtures thereof, with lithium bromide being most preferred. Such lithium halide salts are concentrated to at least 66.5%, by weight in the highest stage generator $G_3$ to achieve the required low vapor pressure according to the invention. Preferred strong solution lithium halide concentrations in the third stage generator are between about 67% and about 76%, by weight. The other metal halides within the aforesaid list are also used in the same vapor pressure suppression range. However, the specific concentrations of any specific salt or salt mixture to be used may be determined by measuring the concentration at the third generator outlet flow at the desired low pressure.

Other metal salts include alkali metal hydroxides or mixtures of such hydroxides, with sodium hydroxide and/or potassium hydroxide, cesium hydroxide, rubidium hydroxide and their mixtures preferred. The strong solution concentration of the hydroxides for achieving the desired low solution vapor pressures in the high stage generator are between about 70% and about 88%, by weight. However, again, specific concentrations to achieve the desired third stage low pressure operations may be readily determined.

Where the metal halide salts are used, it is advantageous to incorporate a hydroxide, for example, an alkali metal hydroxide such as lithium hydroxide or sodium hydroxide for pH control of the fluid for reducing corrosion problems.

It is particularly important to use a corrosion inhibitor in the high stage generator, because of the temperature of the solution. Molybdate, silicate, tungstate, borate, nitrate or combinations of two or more such corrosion inhibitors may be used. The use of such corrosion inhibitors are well known to those skilled in the art. Where lithium halide aqueous absorption fluid is used, it may also be desirable to use a crystallization inhibitor additive. Such additives include ethanolamine and ethylene diamine, and their use is known to those skilled in the art.

By way of example, a triple effect absorption system shown in FIG. 1 is operated using an aqueous lithium bromide absorption fluid. The temperature of the weak absorption solution entering the third stage generator $G_3$ is 312.0° F. and the lithium bromide concentration is 54.36%, by weight. The solution leaving the generator $G_3$ has a temperature of 426.4° F. and a lithium bromide concentration of 71.75%, by weight. During the process, the maximum pressure in generator $G_3$ is 11.73 psig. In the system, the concentration of lithium bromide from generator $G_2$ is 57.35% and from generator $G_1$ is 57.19%.

In operating a reverse flow cycle apparatus of FIG. 2, the concentration of lithium bromide in the aqueous absorption solution directed into generator $G_3$ is 58.37% and after refrigerant desorption, the fluid directed from the generator is concentrated at 70.93% lithium bromide, by weight. The operating temperature of the weak solution directed into generator $G_3$ was 352.7° F. and the concentrated solution flowing from the generator has a temperature of 424.5° F. During the triple effect cycle operation, the maximum absorption fluid vapor pressure in the high stage generator $G_3$ is 13.60 psig. Lithium bromide concentration in the solution entering generator $G_2$ is 56.27%, and leaving the generator at 58.37%, by weight. The absorption solution entering generator $G_1$ has a salt concentration of 55.13%, and leaving the generator at 56.27%, by weight.

As previously described, the invention is in operating the high stage generator $G_3$ of a triple effect absorption cycle apparatus at pressures of less than 25 psig, preferably less than 20 psig, and more preferably less than 15 psig. However, the intent is to avoid the requirement of a manned operator or observer present during the system operation as required by a code for generator pressures at or in excess of the code requirements.

What is claimed is:

1. A triple effect absorption apparatus comprising one or more absorbers, one or more evaporators and first, second and third stage generators each containing an absorption fluid comprising an aqueous solution of a metal salt comprising an alkali, alkaline earth or transition metal halide, or an alkali metal hydroxide, and first, second and third condensers operatively communicating with said first, second and third stage generators, respectively and operating at successively higher temperatures, respectively, wherein the concentration of said metal salt in said aqueous solution in the third stage generator is a strong solution concentration sufficient to provide operating vapor pressures therein below 25 psig.

2. The apparatus of claim 1 wherein said metal salt is a lithium halide.

3. The apparatus of claim 1 wherein said metal salt is lithium bromide.

4. The apparatus of claim 1 wherein said aqueous solution is a mixture of lithium halides.

5. The apparatus of claim 4 wherein said aqueous solution comprises a mixture of lithium bromide and lithium chloride.

6. The apparatus of claim 2 wherein said strong solution concentration of said lithium halide in said third stage generator is at least 66.5%, by weight.

7. The apparatus of claim 3 wherein said strong solution concentration of said lithium bromide in said third stage generator is at least 66.5%, by weight.

8. The apparatus of claim 4 wherein said strong solution concentration of said lithium halide mixture in said third stage generator is at least 66.5%, by weight.

9. The apparatus of claim 2 wherein said strong solution concentration of said lithium halide in said third stage generator is between about 67% and about 76%, by weight.

10. The apparatus of claim 3 wherein said strong solution concentration of said lithium bromide in said third stage generator is between about 67% and about 76%, by weight.

11. The apparatus of claim 4 wherein said strong solution concentration of said lithium halide mixture in said third stage generator is between about 67% and 76%, by weight.

12. The apparatus of claim 1 wherein said concentration of metal salt in said absorption fluid is sufficient to provide on operating vapor pressure in said third stage generator of less than 15 psig.

13. The apparatus of claim 1 wherein said metal salt is an alkali metal hydroxide or mixtures of alkali metal hydroxides.

14. The apparatus of claim 1 wherein said metal salt is sodium hydroxide, potassium hydroxide, cesium hydroxide, rubidium hydroxide or mixtures thereof.

15. The apparatus of claim 14 wherein said strong solution concentration of said metal salt in said third stage generator is between about 70% and about 88%, by weight.

16. The apparatus of claim 1 including one or more fluid loops for directing said aqueous absorption fluid from at least one of said absorbers in parallel flow to a plurality of said generators.

17. The apparatus of claim 1 wherein the fluid flow into said third generator is less than 20% of the total amount of aqueous absorption fluid directed into said three generators.

18. The apparatus of claim 1 wherein the fluid flow into said third generator is less than 15% of the total amount of aqueous absorption fluid directed into said three generators.

19. The apparatus of claim 16 wherein the fluid flow into said third generator is less than 20% of the total amount of aqueous absorption fluid directed into said three generators.

20. The apparatus of claim 16 wherein the fluid flow into said third generator is less than 15% of the total amount of aqueous absorption fluid directed into said three generators.

21. The apparatus of claim 1 wherein one or more of said fluid loops comprises at least one flow splitting junction for directing a first portion of aqueous absorption fluid from one of said generators to one or more other of said generators.

22. The apparatus of claim 16 wherein one or more of said fluid loops comprises at least one flow splitting junction for directing a first portion of aqueous absorption fluid from one of said generators to one or more other of said generators.

23. The apparatus of claim 17 including one or more fluid loops for directing said aqueous absorption fluid from at least one of said absorbers in parallel flow to a plurality of said generators.

24. The apparatus of claim 18 including one or more fluid loops for directing said aqueous absorption fluid from at least one of said absorbers in parallel flow to a plurality of said generators.

25. The apparatus of claim 21 wherein the mass or volume of first and second portions of flows of aqueous absorption fluid from a flow splitting junction are uneven.

26. The apparatus of claim 1 including one or more fluid loops for directing said aqueous absorption fluid from at least one of said absorbers in series flow to a plurality of said generators.

27. The apparatus of claim 26 wherein one or more of said fluid loops comprises at least one flow splitting junction for directing a first portion of aqueous absorption fluid from one of said generators to one or more other of said generators.

28. The apparatus of claim 16 including one or more fluid loops for directing said aqueous absorption fluid from at least one of said absorbers in series flow to a plurality of said generators.

29. The apparatus of claim 28 wherein one or more of said fluid loops comprises at least one flow splitting junction for directing a first portion of aqueous absorption fluid from one of said generators to one or more other of said generators.

30. The apparatus of claim 1 wherein said third stage generator is direct fired.

31. The apparatus of claim 30 wherein said third generator includes means for combustion air pre-heating.

32. The apparatus of claim 30 wherein combustion gases from the third stage generator are used for heating one or more of the lower stage generators.

33. The apparatus of claim 1 wherein said aqueous solution in said third generator comprises a metal halide and includes an alkali or alkaline earth metal hydroxide pH control additive.

34. The apparatus of claim 1 wherein said aqueous solution in said third generator includes a corrosion inhibitor additive comprising a molybdate, silicate, tungstate, borate, chromate or nitrate, or mixtures of two or more thereof.

35. The apparatus of claim 1 wherein said aqueous solution in said third generator comprises lithium halide and includes a crystallization inhibitor additive comprising ethanolamine or ethylene diamine.

36. A method of operating a triple effect absorption cycle apparatus having first, second and third stage generators containing an absorption fluid comprising an aqueous solution of a metal salt comprising an alkali, alkaline earth or transition metal halide, or an alkali metal hydroxide and operating at successively higher temperatures, respectively, said method comprising operating the third stage generator at vapor pressure of below 25 psig.

37. The method of claim 36 wherein said metal salt comprises lithium halide and wherein the concentration of said lithium halide in the third stage generator is increased to at least 66.5%, by weight.

38. The method of claim 37 wherein the concentration of said lithium halide in said third stage generator is increased to between about 67% and about 76% by weight.

39. The method of claim 36 wherein the third stage generator contains an aqueous solution of one or more alkali metal hydroxides, said method comprising increasing the concentration thereof in said third stage generator to between about 70% and about 88%, by weight.

* * * * *